Figure 1:
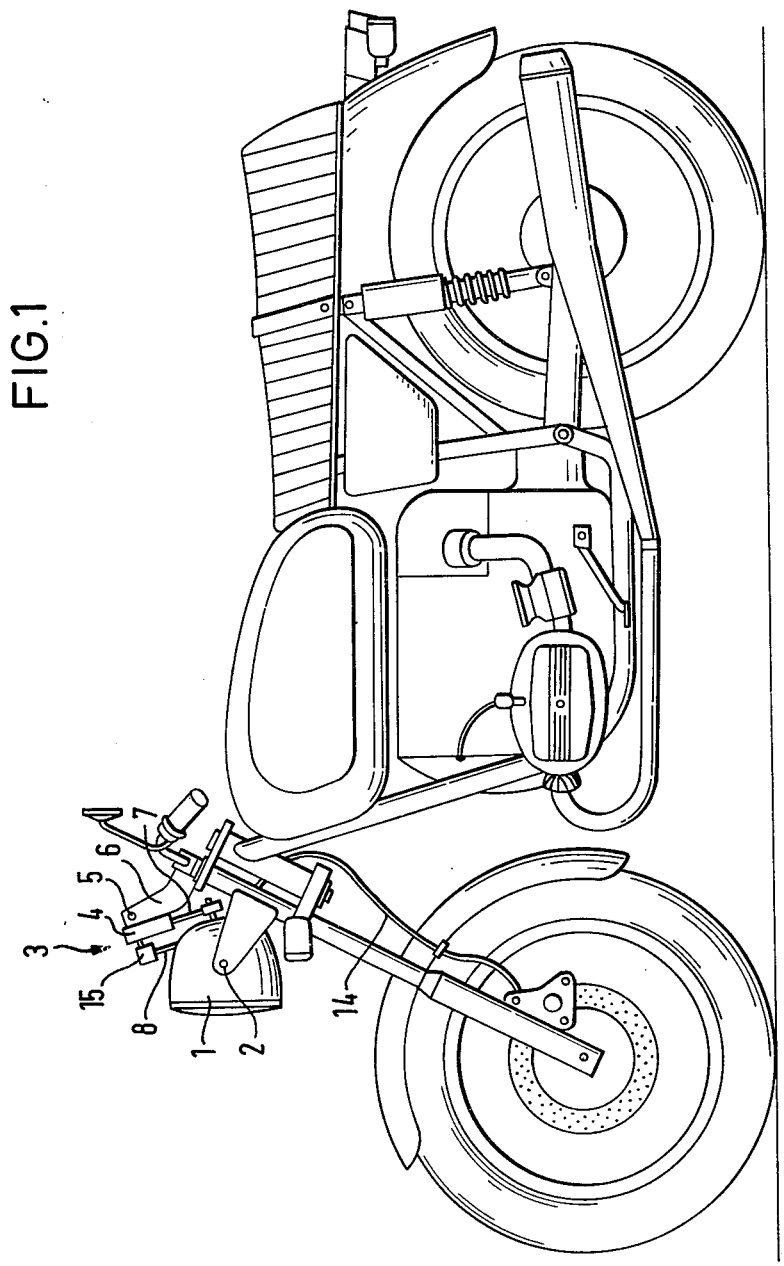

United States Patent [19]

Hundemer

[11] 4,237,524
[45] Dec. 2, 1980

[54] PRESSURE-MEDIUM-ACTUATED INSTALLATION FOR ADJUSTING THE INCLINATION OF A VEHICLE HEADLIGHT

[75] Inventor: Peter Hundemer, Hackensack, N.J.

[73] Assignee: Bayerische Motoren Werke Atiengesellschaft, Fed. Rep. of Germany

[21] Appl. No.: 12,474

[22] Filed: Feb. 15, 1979

[30] Foreign Application Priority Data

Feb. 15, 1978 [DE] Fed. Rep. of Germany ....... 2806306

[51] Int. Cl.³ ............................................ B60Q 1/10
[52] U.S. Cl. ...................................... 362/71; 362/72; 362/276
[58] Field of Search ..................... 362/71, 72, 276, 66

[56] References Cited

U.S. PATENT DOCUMENTS 3,728,538  4/1973  Bailly .................................... 362/71

Primary Examiner—Stephen J. Lechert, Jr.
Attorney, Agent, or Firm—Craig & Antonelli

[57] ABSTRACT

An installation actuated by pressure medium for adjusting the inclination of a headlight in relation to the road plane, especially in a motorcycle, with an adjusting cylinder mounted at the frame or the like and operatively connected with the headlight, which pivots the headlight about a cross-axis upon actuation by the pressure medium of the hydraulic brake system, to which the adjusting piston is connected.

10 Claims, 2 Drawing Figures

PRESSURE-MEDIUM-ACTUATED INSTALLATION FOR ADJUSTING THE INCLINATION OF A VEHICLE HEADLIGHT

The present invention relates to an installation actuated by a pressure medium for adjusting the inclination of a vehicle headlight in relation to the road plane, especially in a motorcycle, with an adjusting cylinder, on the one hand, arranged at the vehicle frame or the like and, on the other, operatively connected with the headlight, which upon actuation by pressure medium, pivots the headlight about a cross-axis.

During the inclination of a vehicle about its cross-axis, for example, caused by an abrupt acceleration or braking, normally its front or rear area is raised or lowered. With a headlight rigidly connected with the vehicle body, the road is thereby illuminated by the inclination of the headlight either within an area which is considerably too short or very distant. In both cases, a situation endangering the traffic may result therefrom. Consequently, the installation described above, as disclosed in the German Auslegeschrift No. 24 53 311 has been proposed, which includes a hydraulic control circuit, by means of which during the inward and outward spring deflection of the front or rear wheel of a motorcycle, the height inclination of the headlight is automatically controlled by fluid displacement by way of an adjusting cylinder. This installation is extraordinarily complicated and therefore correspondingly expensive since it includes a control circuit of its own as well as a guide arm mounted at the front wheel fork. Furthermore, some operational parts of the installation are arranged unprotected so that also the functioning ability thereof can be readily impaired by damage or also by weather influences.

The present invention, in contrast thereto, is concerned with the task to construct an installation of the aforementioned type in a simple and therewith cost-favorable manner such that during the braking of the motorcycle, the angle of inclination of the headlight remains essentially unchanged in relation to the road plane.

The underlying problems are solved according to the present invention in that the adjusting cylinder is connected with the hydraulic brake system.

The installation according to the present invention essentially consists only of an additional hydraulic cylinder as well as of a connecting line and can therefore be manufactured in a price-favorable manner and is also hardly prone at all to any failure during the operation. Since during the actuation of the brake, a part of the brake fluid escapes into the working space of the control cylinder, there additionally results in an advantageous manner—until the pressure force becomes fully effective at the wheel brake cylinders—a larger pivot range at the hand brake lever, whence the brake force can be metered somewhat more finely.

In realization of the present invention, the line is to be connected to the hydraulic brake system of the front wheel.

Accordingly, it is an object of the present invention to provide an installation actuated by pressure medium for adjusting the inclination of a vehicle headlight which avoids by simple means the aforementioned shortcomings and drawbacks encountered in the prior art.

Another object of the present invention resides in a pressure-medium-actuated installation for adjusting the inclination of a vehicle headlight, especially of a motorcycle headlight, which effectively avoids an illumination by the headlight which is either too short or too far and thereby also contributes significantly to the traffic safety.

A further object of the present invention resides in a pressure-medium-actuated installation for automatically adjusting the inclination of a vehicle headlight, especially of a motorcycle, to compensate for pitching movements during accelerations or decelerations thereof.

Still another object of the present invention resides in an installation for adjusting the inclination of a motorcycle headlight which is simple in construction, utilizes relatively few parts and can therefore be manufactured and installed in a relatively inexpensive and simple manner.

A still further object of the present invention resides in an installation of the type described above which is not only relatively simple in construction but additionally assures great reliability in operation under all conditions.

Another object of the present invention resides in a pressure-medium-actuated adjusting mechanism for the headlight of a motorcycle which automatically adjusts the inclination thereof about a transverse axis to compensate for pitching movements during accelerations or decelerations and at the same time renders somewhat more sensitive the actuation of the hand brake.

Figure 2:
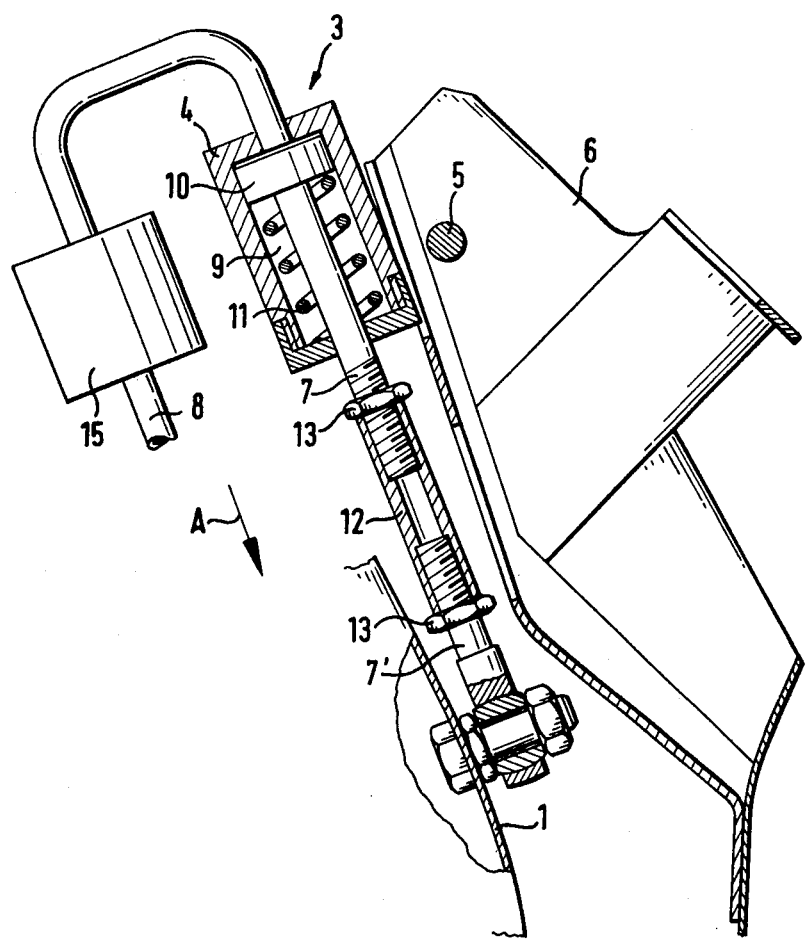

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic side elevational view of a motorcycle with an adjusting cylinder arranged at the headlight in accordance with the present invention; and FIG. 2 is a partial view illustrating in longitudinal cross section the details of the adjusting cylinder in accordance with the present invention.

Referring now to the drawing wherein like reference numerals are used throughout the two views to designate like parts, a motorcycle illustrated in FIG. 1 is equipped with a headlight 1 which is pivotally secured at the frame by way of a pivot shaft 2 or the like. An installation generally designated by reference numeral 3 serves for pivoting the headlight 1 in relation to the road plane. The installation 3 includes an adjusting cylinder 4 which is pivotally connected at a part 6 of the frame by way of a threaded bolt 5 whereas its piston rod 7 is pivotally connected with the headlight 1. A hydraulic line 8 branches off from the hydraulic line 14 leading to the front wheel brake of the motorcycle, which branch line is connected with the adjusting cylinder 4. Similarly, the hydraulic line 8 may also be connected with the hydraulic brake system of the rear wheel or with a compound brake system.

During actuation of the brake installation, pressure medium is fed into the piston side of the working space 9 of the adjusting cylinder 4 (FIG. 2), as a result of which the piston 10 is displaced in the direction of arrow A against the spring force of a compression spring 11.

The headlight 1 is thereby pivoted with its area disposed to the rear of the shaft 2 in the downward direction whereas it is pivoted upwardly with its area disposed in front of the shaft 2. As a result of this measure, the inclination of the headlight 1 in relation to the road plane which exists in the normal driving position, is maintained essentially also during the inward spring deflections of its front wheel, i.e., during the nose-diving caused by the braking of the motorcycle. As a result thereof, the illumination of the road is not impaired or at most only impaired insignificantly which is of significance, especially with a turned-on lower beam. If the piston 10 is no longer acted upon by the pressure medium, the compression spring 11 forces the same back into its normal position and thereby simultaneously forces out the pressure fluid such as oil disposed on the piston side of the working space 9 which flows back into the master brake cylinder. Simultaneously therewith, the headlight 1 is also pivoted into its starting position.

The piston rod 7 is constructed longitudinally adjustable in its center portion. For that purpose, a sleeve 12 is provided whose two end areas are provided with oppositely directed internal threads. The piston rod 7 and the piston rod end section 7' are screwed into the same, which are both secured against rotation by means of a counter-nut 13 provided at a respective end face of the sleeve 12.

In order to prevent that the headlight 1 can pivot during standstill of the motorcycle, an electrically actuated valve 15 may be interconnected into the line 8 which is controllable, for example, by way of the tachometer, the electric transmission speed indication or the like in such a manner that the pressure medium supply into the adjusting cylinder 4 is interrupted when the motorcycle stands still and its brake is actuated.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An installation actuated by a fluid pressure medium for adjusting the inclination of a vehicle headlight in relation to the road plane, comprising adjusting cylinder means, on the one hand, arranged at a relatively fixed part of the vehicle and, on the other, operatively connected with the headlight, said adjusting cylinder means being operable to pivot the headlight about a cross axis during actuation of said adjusting cylinder means by the fluid pressure medium, characterized in that the adjusting cylinder means is operatively connected with a hydraulic brake system of the vehicle such that hydraulic fluid of said hydraulic brake system actuates said adjusting cylinder means to pivot the headlight about said cross axis.

2. An installation according to claim 1, characterized in that the vehicle is a motorcycle.

3. An installation according to claim 1 or 2, characterized in that the relatively fixed part is formed by the vehicle frame.

4. An installation according to claim 1 or 2, characterized by a line means leading to the adjusting cylinder means which is operatively connected with the hydraulic brake system for the front wheel.

5. An installation according to claim 4, characterized in that the adjusting cylinder includes piston rod means constructed changeable in its length.

6. An installation according to claim 5, characterized in that the adjusting cylinder means is held in its normal position by a compression spring.

7. An installation according to claim 6, characterized in that a valve means is provided which is operable to interrupt the pressure medium connection between the hydraulic brake system and the adjusting cylinder means when the vehicle stands still.

8. An installation according to claim 1 or 2, characterized in that the adjusting cylinder means includes piston rod means constructed changeable in its length.

9. An installation according to claim 1 or 2, characterized in that the adjusting cylinder means is held in its normal position by a compression spring.

10. An installation according to claim 1 or 2, characterized in that a valve means is provided which is operable to interrupt the pressure medium connection between the hydraulic brake system and the adjusting cylinder means when the vehicle stands still.

* * * * *